I. J. WEBSTER.
PNEUMATIC TIRE.
APPLICATION FILED AUG. 13, 1915.

1,162,671.

Patented Nov. 30, 1915.

WITNESSES
C. F. Volk
J. Thomson

INVENTOR
I. J. Webster
BY
Duell, Warfield & Duell
ATTORNEYS

UNITED STATES PATENT OFFICE.

IRA J. WEBSTER, OF HAVERHILL, MASSACHUSETTS.

PNEUMATIC TIRE.

1,162,671.   Specification of Letters Patent.   Patented Nov. 30, 1915.

Application filed August 13, 1915. Serial No. 45,408.

*To all whom it may concern:*

Be it known that I, IRA J. WEBSTER, a citizen of the United States, residing at Haverhill, in the county of Essex and State of Massachusetts, have invented certain new and useful Improvements in Pneumatic Tires, of which the following is a full, clear, and exact description, such as will enable others skilled in the art to which it appertains to make and use the same.

This invention relates to tires, and, with respect to its more specific features, to pneumatic tubes adapted to be utilized in or as tires.

One of the objects of the invention is the provision of a pneumatic tire offering a relatively high resistance to puncture and adapted to automatically operate to close or seal punctures.

Another object of the invention is the provision of a durable tire of the character described of a simple and inexpensive construction.

Another object of the invention is the provision of an efficient pneumatic tire of the character described which shall be relatively light in weight, and yet retain the qualities of resistance to puncture and the automatic closing of punctures as referred to.

Other objects will be in part obvious and in part pointed out hereinafter.

The invention accordingly consists in the features of construction, combination of elements and arrangement of parts which will be exemplified in the construction hereinafter set forth, and the scope of the application of which will be indicated in the following claims.

Figure 1:
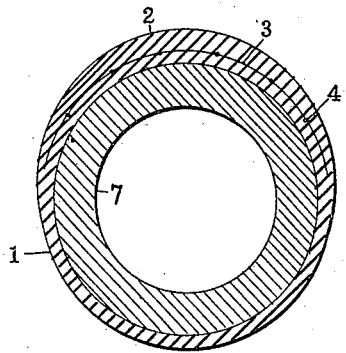
Figure 4:
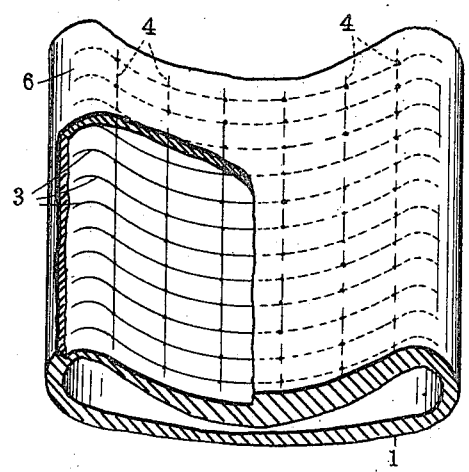
Figure 2:
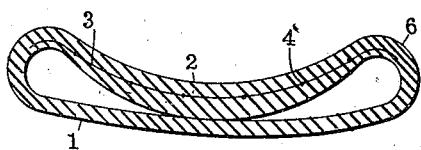
Figure 3:
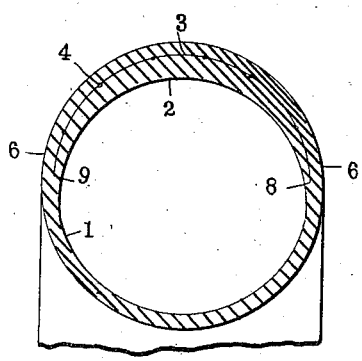

In the accompanying drawings, wherein similar reference characters refer to similar parts throughout the several views, Figure 1 is a sectional view of a mandrel with the tire or tube formed thereon; Fig. 2 illustrates the tire or tube when stripped from the mandrel, and after reversal; Fig. 3 illustrates the tire or tube after having been reversed and inflated; Fig. 4 is a plan of a portion of the tire or tube partly broken away.

The tire forming the subject-matter of the present invention is so constructed that when in use a portion of the material composing the same is placed under compression. Pneumatic tires are usually made of rubber, and when the same are inflated, portions thereof usually assume a curved or arcuate form. If the material of the tire is unrestrained under the influence of the pressure of inflation it is placed in a state of tension and it follows that such material when perforated under such condition has a tendency to separate at the punctured point. Thus the puncture has a tendency to enlarge. By the present invention, however, a portion of the tire is placed under compression upon inflation and the compressed part not only tends to resist puncture to a greater degree than a tire entirely under tension, but also the part under compression automatically operates to close a puncture made therein.

Referring now more particularly to the drawings, the numeral 1 indicates a tire or an inner tube which may form a part of a tire, as the case may be, of elastic material, rubber being preferred, and preferably also a portion of this tube is thickened as at 2, said thickened portion being disposed opposite the tread portion of the tire and also providing ample material for the coöperation of threads, hereinafter referred to, which threads are mainly employed for efficiently obtaining and retaining compression.

In the form illustrated in Fig. 4, the numerals 3 indicate a series of threads disposed transversely of the tire or tube opposite the tread and embedded in the rubber. These threads 3 are separate threads and are spaced apart longitudinally of the tire; i. e. in a circumferential direction. These threads 3 hold the tread portion of the rubber tube or tire under compression when the tube is inflated, but on account of being spaced apart, the tube is capable of some longitudinal extension. The threads 3 are joined by a series of threads 4, preferably extending longitudinally of the tube, these latter being designed to more or less definitely space the threads 3 from each other in the process of forming the tire. The threads 4 are also spaced from each other, but transversely of the tube so that the arrangement of the threads 3 and 4 form substantially a net or open mesh structure. The strength of threads 4 may be relatively weak as compared with that of the threads 3, so that in the event of extension of the tube longitudinally sufficient to unduly tension the longitudinal threads 4, these latter may break at one or more points. It will thus be seen that the threads 4 assist in locating the tire compressing threads 3 at definite points around the longitudinal extent of the tire. Furthermore, should the threads 4 break, these broken threads with the threads 3 to which the broken section is connected, will form areas of associated transverse threads and longitudinal threads around the tire in a longitudinal direction, each area acting to retain compression transversely, but the longitudinal extensibility of one area may be independent of that of another. This feature of relatively independent longitudinal extensibility at different areas longitudinally around the tube is important for the reason that the rubber of the tube may vary in extensible qualities at different points around the tire.

The threads 3 are preferably inelastic, such as would be provided by linen or cotton cord or twine, which has some extensibility but is inelastic for practical purposes. Preferably also the threads 4 are inelastic, although some features of the invention would be subserved by the employment of elastic threads 4. The threads 3, 3 are embedded in the rubber of the tire adjacent the edges, as at 6, 6 of the tread portion thereof, and they extend transversely of the tire opposite said tread portion, and preferably are also embedded in the tire opposite said tread portion, so that in the embodiment illustrated, said threads are embedded in the tire throughout their length and throughout the width of the tread. The threads 3, 3, may be drawn through an adhesive substance before being placed in the tire, said substance serving to assist in retaining the threads in position.

The ends of the threads 3, 3 are preferably located adjacent the edges of the tread of the tire and are embedded in the rubber adjacent said edges, preferably somewhat deeper than are the intermediate portions, said intermediate portions lying nearer the outer surface of the tire. In this way these tire compressing threads are securely retained opposite the tread portion and are buried in the tread to such an extent as not to be exposed to wear. By reason of the ends of the threads being longitudinally separated from the ends of adjacent threads, it follows that should sufficient wear take place to expose the ends of certain threads, any separation of such exposed ends from the rubber material of the tire would not affect the ends of adjacent threads. Hence, if the end of one thread were peeled from the tire, the peeling of adjacent threads would not necessarily follow. This advantage is a substantial one as the lasting qualities of the tire are more or less dependent thereon.

The tire or tube above described may be made in any suitable manner which will effect the objects sought. In Fig. 1 is shown a cylindrical mandrel 7, on which the rubber tube or tire may be built up by successive layers or portions of rubber vulcanized to each other so as to present a practically integral structure. After some thickness has been attained the threads referred to may be laid in position, whereupon additional layers of rubber are placed in position over the thread, the tube being thus thickened at the portion occupied by the thread, this thickened portion being designed to be opposite the tread portion of the tire. The tube so made is stripped from the mandrel and turned inside out, whereupon it, when not inflated, may assume a shape such as shown in Fig. 2. It is then ready to be inflated, and when inflated the transversely disposed threads cause the material or rubber of the tube to be placed under compression on the inside as between the points 8 and 9, around the tire at the thickened portion. The amount of compression will of course depend more or less upon the transverse curvature of the tire, but in any case, sufficient compression may be obtained so that the compressed portion will resist puncture to a greater degree than the uncompressed portion, and it will be clear that should a puncture occur in the compressed portion, the material thereof will expand, thus automatically closing or sealing the puncture. The plane occupied by the threads may be at any radial point in the thickness of the tire or tube, but is preferably somewhat farther from the inner than the outer surface, so as to provide on the inside ample volume of rubber to be compressed. On account of the fact that the tread of the tire has a tendency to wear more quickly adjacent the edges, the ends of the threads may be embedded somewhat deeper adjacent said edges as previously referred to.

Thus by the above described construction are accomplished among others, the objects hereinbefore stated.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:—

1. In a pneumatic tire, in combination, a tread portion, a series of transversely disposed separate tire compressing threads embedded in the rubber of the tire opposite said tread portion, and means comprising a thread extending transversely of said tire compressing threads adapted to restrain movement of said latter threads longitudinally of the tire.

2. In a pneumatic tire, in combination, a tread portion, a series of transversely disposed separate tire compressing threads embedded in the rubber of the tire opposite said thread portion, and means comprising a plurality of threads extending transversely of said tire compressing threads and joined thereto adapted to restrain movement of said latter threads longitudinally of the tire.

3. In a pneumatic tire, in combination, a tread portion, a series of transversely disposed separate tire compressing threads embedded in the rubber of the tire opposite said tread portion and spaced apart longitudinally of the tire, and means comprising a plurality of threads extending transversely of said tire compressing threads and joined thereto adapted to restrain movement of said latter threads longitudinally of the tire.

4. In a pneumatic tire, in combination, a tread portion, a series of transversely disposed separate tire compressing threads embedded in the rubber of the tire opposite said tread portion, said threads being spaced apart longitudinally of the tire, and threads connecting said first mentioned threads and extending transversely thereof.

In testimony whereof I affix my signature, in the presence of two witnesses.

IRA J. WEBSTER.

Witnesses:
 ROBERT D. TRASK,
 ARTHUR H. GREEN.